United States Patent
Jeong et al.

(10) Patent No.: US 10,700,387 B2
(45) Date of Patent: Jun. 30, 2020

(54) LOW RESISTANCE NEGATIVE ELECTRODE HAVING EXCELLENT ADHESIVENESS AND LITHIUM SECONDARY BATTERY COMPRISING THE SAME

(71) Applicant: LG Chem, Ltd., Seoul (KR)

(72) Inventors: Kwang-Ho Jeong, Daejeon (KR); Ye-Cheol Rho, Daejeon (KR); Jin-Sook Ryu, Daejeon (KR); Je-Young Kim, Daejeon (KR); Jung-Woo Yoo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 59 days.

(21) Appl. No.: 15/812,032

(22) Filed: Nov. 14, 2017

(65) Prior Publication Data
US 2018/0138557 A1    May 17, 2018

(30) Foreign Application Priority Data
Nov. 15, 2016   (KR) .......................... 10-2016-0152089

(51) Int. Cl.
| | |
|---|---|
| H01M 10/42 | (2006.01) |
| H01M 4/1391 | (2010.01) |
| H01M 4/131 | (2010.01) |
| C08L 1/28 | (2006.01) |
| H01M 4/04 | (2006.01) |
| H01M 4/62 | (2006.01) |
| H01M 4/505 | (2010.01) |
| H01M 4/525 | (2010.01) |
| H01M 4/587 | (2010.01) |
| H01M 10/0525 | (2010.01) |
| C08B 11/12 | (2006.01) |

(52) U.S. Cl.
CPC ......... *H01M 10/4235* (2013.01); *C08L 1/286* (2013.01); *H01M 4/0404* (2013.01); *H01M 4/131* (2013.01); *H01M 4/1391* (2013.01); *H01M 4/505* (2013.01); *H01M 4/525* (2013.01); *H01M 4/587* (2013.01); *H01M 4/62* (2013.01); *H01M 4/621* (2013.01); *H01M 4/622* (2013.01); *H01M 4/623* (2013.01); *H01M 4/625* (2013.01); *H01M 10/0525* (2013.01); *C08B 11/12* (2013.01); *C08L 2205/025* (2013.01); *H01M 2220/30* (2013.01)

(58) Field of Classification Search
CPC ............. H01M 10/4235; H01M 4/621; H01M 4/1391; H01M 4/131; H01M 4/0404; H01M 4/622; H01M 10/0525; H01M 4/505; H01M 4/525; H01M 4/587; H01M 4/62; H01M 4/623; H01M 4/625; H01M 2220/30; C08L 1/286; C08L 2205/025; C08B 11/12

See application file for complete search history.

(56) References Cited

U.S. PATENT DOCUMENTS

| | | | |
|---|---|---|---|
| 2007/0298351 A1* | 12/2007 | Shimada | ............... B41C 1/1016 430/281.1 |
| 2012/0231337 A1 | 9/2012 | Miyata et al. | |
| 2014/0080945 A1* | 3/2014 | Andermann, Jr. | ....... C08L 1/286 524/29 |

FOREIGN PATENT DOCUMENTS

| | | |
|---|---|---|
| JP | 2013-089422 A | 5/2013 |
| KR | 10-2014-0032098 A | 3/2014 |
| KR | 10-2015-0071453 A | 6/2015 |

OTHER PUBLICATIONS

Lee et al. J. Phys. Chem. C 2013, 117, 4404-4409 (Year: 2013).*

* cited by examiner

*Primary Examiner* — Andrew J. Oyer
(74) *Attorney, Agent, or Firm* — Birch, Stewart, Kolasch & Birch, LLP

(57) ABSTRACT

A carboxymethyl cellulose is provided with a polydispersity index of 10 or more and a weight average molecular weight of 2,000,000 or more in a negative electrode mix slurry. Accordingly, phase stability of the negative electrode mix slurry is improved, achieving improved adhesiveness and low resistance of a negative electrode manufactured therefrom.

15 Claims, No Drawings

LOW RESISTANCE NEGATIVE ELECTRODE HAVING EXCELLENT ADHESIVENESS AND LITHIUM SECONDARY BATTERY COMPRISING THE SAME

CROSS-REFERENCE TO RELATED APPLICATION

The present application claims the benefit of Korean Patent Application No. 10-2016-0152089 filed on Nov. 15, 2016, the disclosure of which is incorporated herein by reference in its entirety.

TECHNICAL BACKGROUND

The present disclosure relates to a low resistance negative electrode having improved adhesiveness and a lithium secondary battery comprising the same.

RELATED ART

Recently, with the technology development and the increasing demand for mobile devices, the demand for secondary batteries as a source of energy has also increased. Among secondary batteries, lithium secondary batteries with high energy density and voltage, a long cycle life and a low self-discharge rate have been developed.

In addition, with the increasing interest in environmental issues, the market of devices employing high capacity batteries is increasing. For example, electric vehicles and hybrid electric vehicles that provide an alternative to vehicles using fossil fuels such as gasoline vehicles and diesel vehicles, known as one of the main causes of air pollution, expanding the demand for high capacity batteries, and accordingly, there is a need for a higher capacity electrode design to manufacture lithium secondary batteries with high energy density, high output and high discharge voltage as a source of power for these devices. For higher capacity electrode design, developments have been made regarding an electrode with high active material loading. However, this high loading design causes an overvoltage of the electrode, especially, the negative electrode, and consequentially increases the electrode resistance.

Meanwhile, carboxymethyl cellulose (CMC) has a high thickening effect and improved coating performance and adhesiveness, and thus prevents the separation of an active material from a current collector and exhibits improved cycling characteristics. In addition, carboxymethyl cellulose has high solubility in water and is rather easy to ionize. Accordingly, carboxymethyl cellulose is used in performing a process for manufacturing an aqueous electrode after being dispersed in water with an aqueous binder such as styrene-butadiene rubber (SBR).

SUMMARY

When high molecular weight carboxymethyl cellulose is selected to be used as a thickening agent in a negative electrode mix slurry, the negative electrode mix slurry achieves phase stability and improved electrode adhesiveness, resulting in improved processability, while increasing a battery resistance. In this context, the present disclosure provides a negative electrode mix slurry that meets the adhesiveness requirement of the negative electrode using carboxymethyl cellulose as a thickening agent. The present disclosure is further directed to a high capacity or high loading negative electrode having low resistance with the aforementioned effect. Additionally, the present disclosure is directed to a lithium secondary battery comprising the negative electrode.

According to an exemplary embodiment of the present disclosure, a negative electrode mix slurry for a lithium secondary battery may include carboxymethyl cellulose with a polydispersity index (PDI) of about 10 or more and a weight average molecular weight of about 2,000,000 or more.

The carboxymethyl cellulose may include carboxymethyl cellulose with a molecular weight ranging from about 1,000,000 to 3,000,000. The carboxymethyl cellulose may have a degree of substitution ranging from about 0.6 to 1.2. Additionally, the carboxymethyl cellulose may be obtained by mixing carboxymethyl cellulose with a weight average molecular weight of less than about 2,000,000 and carboxymethyl cellulose with a weight average molecular weight of about 2,000,000 or more. The carboxymethyl cellulose may be obtained by milling carboxymethyl cellulose with a weight average molecular weight of about 3,000,000 or more.

According to another exemplary embodiment of the present disclosure, a negative electrode for a lithium secondary battery is provided wherein the carboxymethyl cellulose may be present in an amount of about 0.6 to 1.2 wt % of negative electrode active material layer. A sum of the carboxymethyl cellulose and binder polymer may amount to about 1.0 to 5.0 wt % of negative electrode active material layer.

According to still another exemplary embodiment, a lithium secondary battery may include the negative electrode. The negative electrode mix slurry according to an exemplary embodiment of the present disclosure has improved phase stability. Therefore, a negative electrode formed from the negative electrode mix has improved adhesiveness. Furthermore, a battery with the negative electrode according to the present disclosure has low resistance even though relatively high molecular weight carboxymethyl cellulose is used as a thickening agent.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages and features of the present disclosure, and technologies therefor will be apparent from the following exemplary embodiments in conjunction with the accompanying drawings. However, the present disclosure is not limited to the disclosed exemplary embodiments and may be embodied in many various forms. These exemplary embodiments may be provided to render the disclosure of the present disclosure complete, and convey the scope of the present disclosure fully to those having ordinary skill in the technical field pertaining to the present disclosure. Like reference symbols represent like elements throughout the specification.

The present disclosure provides a negative electrode with improved adhesiveness and low resistance manufactured using carboxymethyl cellulose with a polydispersity index ((PDI), PDI=weight average molecular weight($M_w$)/number average molecular weight($M_n$)) of about 10 or more and a weight average molecular weight of about 2,000,000 or more in a negative electrode mix slurry. In particular, when a high molecular weight carboxymethyl cellulose with a polydispersity index of about 24 or more is used in a negative electrode mix slurry, adhesiveness of the negative electrode and battery resistance characteristics may be improved.

A high polydispersity index represents a substantial standard deviation of a molecular weight distribution, implying that a greater amount of carboxymethyl cellulose with the molecular weight that is greater or less than the weight average molecular weight exists therein. The high molecular weight carboxymethyl cellulose with a high polydispersity index according to an exemplary embodiment of the present disclosure may be obtained by a grinding process over time, for example, a milling process; using raw material pulps with different molecular weights when manufacturing carboxymethyl cellulose; by applying different reaction conditions when manufacturing carboxymethyl cellulose; or by mixing low molecular weight carboxymethyl cellulose and high molecular weight carboxymethyl cellulose, but the present disclosure is not limited thereto.

Non-limiting examples of the method for obtaining the carboxymethyl cellulose according to an exemplary embodiment of the present disclosure by mixing a low molecular weight carboxymethyl cellulose and a high molecular weight carboxymethyl cellulose may include a method for obtaining the carboxymethyl cellulose with a molecular weight of about 2,200,000 and a PDI of about 12.9 by mixing carboxymethyl cellulose with a weight average molecular weight of about 2,000,000 and carboxymethyl cellulose with a weight average molecular weight of about 3,000,000 at a mix ratio of 1:1 by weight, and a method for obtaining the carboxymethyl cellulose with a molecular weight of about 2,000,000 and a PDI of about 24.8 by mixing carboxymethyl cellulose with a weight average molecular weight of about 1,600,000 and carboxymethyl cellulose with a weight average molecular weight of about 3,000,000 at a mix ratio of 1:1 by weight. Additionally, the carboxymethyl cellulose according to the present disclosure may be obtained by mixing carboxymethyl cellulose with a lower weight average molecular weight and carboxymethyl cellulose with a higher weight average molecular weight at an appropriate mix ratio.

Alternatively, non-limiting examples may include a method for obtaining the carboxymethyl cellulose with a weight average molecular weight of about 2,600,000 and a PDI of about 14.7 by milling carboxymethyl cellulose with a weight average molecular weight of about 3,000,000 for about 0.5 hour, or a method for obtaining the carboxymethyl cellulose with a weight average molecular weight of about 2,000,000 and a PDI of about 21.5 by milling carboxymethyl cellulose with a weight average molecular weight of about 3,000,000 for about 1 hour, but the present disclosure is not limited thereto.

In the subject disclosure, carboxymethyl cellulose may be in a form of salt such as lithium (Li) salt, sodium (Na) salt, potassium (K) salt or ammonium ($NH_3$) salt, or mixtures thereof. The 'low molecular weight' term as used herein may be understood as referring to a molecular weight of less than about 2,000,000. The 'high molecular weight' term as used herein may be understood as referring to a molecular weight of about 2,000,000 or more. The polydispersity index (PDI) as used herein is a value obtained by analyzing gel permeation chromatography (GPC), and refers to a value obtained by dividing the weight average molecular weight ($M_w$) by the number average molecular weight ($M_n$).

The carboxymethyl cellulose according to an exemplary embodiment of the present disclosure may be carboxymethyl cellulose with a molecular weight ranging from about 1,000,000 to about 3,000,000 and a PDI of about 10 or more. When the carboxymethyl cellulose has the molecular weight within the above-mentioned range, the phase stability of the negative electrode mix slurry may be improved by the high molecular weight carboxymethyl cellulose, and the battery resistance may be decreased by the low molecular weight carboxymethyl cellulose.

The carboxymethyl cellulose according to an exemplary embodiment of the present disclosure may possess a degree of substitution (DS) ranging from about 0.6 to 1.2 or a degree of substitution (DS) ranging from about 0.6 to 0.9 or a degree of substitution (DS) ranging more than about 0.9 to 1.2. The degree of substitution is a value that represents the number of substituents of salt in one (1) carboxymethyl cellulose derivative. The negative electrode manufactured from the negative electrode mix slurry including carboxymethyl cellulose with the degree of substitution ranging from about 0.6 to 1.2 and a lithium secondary battery comprising the negative electrode may have improved processability since the DS less than about 0.6 makes dissolution of the carboxymethyl cellulose difficult, resulting in an increase in an amount of undissolved materials, and a DS greater than about 1.2 reduces the affinity for the active material, resulting in a reduction in dispersability.

The carboxymethyl cellulose according to an exemplary embodiment of the present disclosure may be present in the negative electrode mix slurry in an amount of about 0.6 to 1.2 wt % or about 0.8 to 1.2 wt % based on an amount of solid component such as active material, binder polymer, conductive agent and thickening agent in negative electrode active material layer. When the amount of carboxymethyl cellulose is used in an amount according to the above-described range, the intended adhesiveness may be achieved while not acting as an unnecessary resistance factor to the negative electrode. For example, use of about 0.8 wt % of carboxymethyl cellulose according to the present disclosure results in improved adhesiveness and lower resistance compared to use of about 1.4% or more of a thickening agent including only carboxymethyl cellulose with a molecular weight of less than about 2,000,000.

In an exemplary embodiment of the present disclosure, a negative electrode mix slurry may include the carboxymethyl cellulose with a negative electrode active material and a binder polymer, and a negative electrode manufactured therefrom. The negative electrode mix slurry may further include a conductive material.

The negative electrode active material may include, but is not limited to, carbon materials having graphite-based carbon such as non-graphitizable carbon, natural graphite, artificial graphite, and graphite; metal composite oxide such as lithium titanium oxide, $Li_xFe_2O_3 (0 \leq x \leq 1)$, $Li_xWO_2 (0 \leq x \leq 1)$, $Sn_xMe_{1-x}Me'_yO_z$ (Me: Mn, Fe, Pb, Ge; Me': Al, B, P, Si, elements of Group 1, 2 and 3 in the periodic table, halogen; $0 < x \leq 1$; $1 \leq y \leq 3$; $1 \leq z \leq 8$); lithium metal; lithium alloys; silicon-based alloys; tin-based alloys; oxide such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$; conductive polymer such as polyacetylene; and Li—Co—Ni-based materials. The negative electrode active material may be present in an amount of about 94 wt % to 99 wt % based on 100 wt % of negative electrode active material layer.

The binder polymer may include at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and styrene-butadiene rubber. Particularly, when the negative electrode is manufactured by an aqueous process, the binder is preferably an aqueous binder such as styrene-butadiene rubber (SBR) and polyacrylonitrile (PAN). The sum of the binder polymer and the carboxymethyl cellulose may be about 1.0 to 5.0 wt % of negative electrode active material layer.

Furthermore, the negative electrode mix slurry of the present disclosure may further include a conductive material to ensure or improve conductivity. The conductive material is not limited to any particular type when the material has high electrical conductivity while not causing a side reaction in an internal environment of a secondary battery or a chemical change to the corresponding battery. In particular, the conductive material may include a carbon-based material with high conductivity. The carbon-based material may include carbon black, acetylene black, channel black, ketjen black, furnace black, lamp black and thermal black, used singly or in combination. However, the conductive material is not limited thereto. Further, non-limiting examples of the conductive material may include at least one selected from the group consisting of polyacetylene, polyaniline, polypyrrole, polythiophene, polysulfonitride, indium thin oxide (ITO), copper, silver, palladium and nickel. The conductive material may be present in an amount of about 0.2 to 10 wt %, preferably 5 wt % or less, and more preferably 3 wt % or less, based on 100 wt % of active material layer.

A current collector used in the negative electrode may be metal with high conductivity, and may include any material to which the negative electrode mix may be easily adhered, and which is not reactive in the voltage range of an electrochemical device. The current collector is not limited to a particular type, but for example, may include stainless steel, aluminum, nickel, titanium, sintered carbon, or aluminum or stainless steel having a surface treated with carbon, nickel, titanium, or silver. Additionally, the current collector may have fine surface texture (e.g., substantially smooth) to increase the adhesiveness of the electrode active material, and may be formed in various types including films, sheets, foils, nets, porous materials, foams, and nonwovens.

A method for manufacturing the negative electrode is described in brief as below.

First, a negative electrode active material, carboxymethyl cellulose, and binder polymer may be introduced into a solvent and mixed to prepare a negative electrode mix slurry. When an aqueous process is used, water may be used as a solvent. Further, an aqueous binder such as SBR may be used as a binder polymer. The negative electrode mix slurry may further include a conductive material and/or other additive within an appropriate range. The prepared negative electrode mix slurry may be coated on a current collector. The coating may include extrusion coating of the negative electrode mix slurry using an extruder.

Furthermore, the present disclosure provides an electrochemical device that may include the negative electrode, a positive electrode, and a separator interposed between the negative electrode and the positive electrode. The electrochemical device of the present disclosure may include all devices in which electrochemical reaction occurs, and specific examples include all types of primary batteries, secondary batteries, solar cells or capacitors including supercapacitors. Particularly, among these secondary batteries, lithium secondary batteries including lithium metal secondary batteries, lithium ion secondary batteries, lithium polymer secondary batteries or lithium ion polymer secondary batteries are preferable. The positive electrode may be manufactured by applying a mixture of a positive electrode active material, a thickening agent, and a binder polymer to a positive electrode current collector and drying it, and may further include a conductive material and/or a filler in the mixture when necessary.

In the secondary battery according to the present disclosure, a positive electrode active material of the positive electrode includes, but is not limited to, layered compounds such as lithium nickel-manganese cobalt oxide represented by $Li_aNi_xMn_yCo_zO_2$ ($0.8 \leq a < 1.2$, $0.2 \leq x < 1$, $0 < y < 1$, $0 < z < 1$, $x+y+z=1$), lithium cobalt oxide ($LiCoO_2$), lithium nickel oxide ($LiNiO_2$), or compounds with one or more transition metal substitution; lithium manganese oxide of chemical formula $Li_{1+x}Mn_{2-x}O_4$ (x is 0~0.33), $LiMnO_3$, $LiMn_2O_3$, $LiMnO_2$; lithium copper oxide ($Li_2CuO_2$); vanadium oxide such as $LiV_3O_8$, $LiFe_3O_4$, $V_2O_5$, $Cu_2V_2O_7$; Ni-site lithium nickel oxide represented by chemical formula $LiNi_{1-x}M_xO_2$ (M=Co, Mn, Al, Cu, Fe, Mg, B or Ga, x=0.01~0.3); lithium manganese composite oxide represented by chemical formula $LiMn_{2-x}M_xO_2$ (M=Co, Ni, Fe, Cr, Zn or Ta, x=0.01~0.1) or $Li_2Mn_3MO_8$ (M=Fe, Co, Ni, Cu or Zn); $LiMn_2O_4$ with partial substitution of alkali earth metal ion for Li in chemical formula; disulfide compounds; and $Fe_2(MoO_4)_3$. The positive electrode active material may include lithium transition metal oxide, used singly or in combination.

The positive electrode current collector is not limited to any particular type when the type has high electrical conductivity while not causing a chemical change to the corresponding battery, and for example, may include stainless steel, aluminum, nickel, titanium, sintered carbon, or aluminum or stainless steel whose surface is treated with carbon, nickel, titanium, and silver. The positive electrode current collector may have a fine surface texture (e.g., substantially smooth) to increase the adhesiveness of the positive electrode active material, and may be formed in various types including films, sheets, foils, nets, porous materials, foams, and nonwovens.

The binder polymer for the positive electrode active material assists in binding the active material to the conductive material and to the current collector, and generally may be present in an amount of about 1 to 50 wt % based on the total weight of the positive electrode mixture. The binder polymer may include, but is not limited to, the high molecular weight polyacrylonitrile-co-acrylic acid. As another example, the binder polymer may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene ter polymer (EPDM), sulfonated EPDM, styrene-butadiene rubber, fluorine rubber, and a variety of copolymers.

The separator may be interposed between the positive electrode and the negative electrode, and may include an insulating thin film with high ionic permittivity and mechanical strength. Generally, the separator may have a pore diameter of about 0.01-10 µm, and a thickness of about 5-300 µm. The separator may include, for example, chemical-resistant and hydrophobic olefin-based polymer such as polypropylene; sheets or nonwovens made of glass fiber or polyethylene.

The secondary battery of the present disclosure may be manufactured by receiving, in a packaging such as a battery case, an electrode assembly having the positive electrode, the negative electrode and the separator stacked in an alternating manner, together with an electrolyte, followed by sealing. The method for manufacturing a secondary battery may include common methods without limitation.

EXAMPLES

Hereinafter, the exemplary embodiments are described in detail to specifically explain the present disclosure. However, the exemplary embodiments of the present disclosure may be modified in many different forms, and the scope of the present disclosure shall not be construed as being limited to the following exemplary embodiments. The exemplary embodiments of the present disclosure are provided to describe the present disclosure more fully to those skilled in the art.

Example 1

First, sodium carboxymethyl cellulose ("CMC-Na") with a weight average molecular weight of 2,000,000 and a polydispersity index of 7.1 and CMC-Na with a weight average molecular weight of 3,000,000 and a polydispersity index of 6.2 were mixed at a ratio of 1:1 by weight to prepare CMC-Na with a weight average molecular weight of 2,200,000 and a polydispersity index of 12.9.

The CMC-Na was dissolved in 3rd distilled water, and subsequently, artificial graphite and Super-P 65 were introduced and dispersed, and styrene-butadiene rubber (SBR) was added and mixed, to obtain a negative electrode mix slurry. A composition ratio of negative electrode active material:conductive material:thickening agent:binder polymer was 95.7:1.0:0.8:2.5 by weight. The negative electrode slurry was coated on a copper current collector at the weight of 350 mg/25 cm' and dried in a vacuum oven of 100° C. to manufacture an active material layer.

$LiNi_{1/3}Co_{1/3}Mn_{1/3}O_2$ as a positive electrode active material, Super-P as a conductive material, and PVdF as a binder were mixed at a ratio of 98:1:1 to prepare a positive electrode mix slurry, and the positive electrode mix slurry was coated on an aluminum foil of a metal current collector and dried in a vacuum oven of 120° C. for 2 hours or longer to manufacture a positive electrode.

Using the negative electrode and the positive electrode with a polypropylene separator interposed between the negative electrode and the positive electrode, a solution of ethylene carbonate (EC) and dimethyl carbonate (DMC) at a volume ratio 1:1 containing 1M $LiPF_6$ dissolved therein was injected to manufacture a rectangular monocell (negative electrode area 17.34 $cm^2$/positive electrode area 16.5 $cm^2$).

Example 2

A monocell was manufactured by the same method as example 1, except that CMC-Na with a weight average molecular weight of 2,000,000 and a polydispersity index of 24.8 obtained by mixing CMC-Na with a weight average molecular weight of 1,600,000 and a polydispersity index of 6.7 and CMC-Na with a weight average molecular weight of 3,000,000 and a polydispersity index of 6.2 at a ratio of 1:1 by weight was used.

Comparative Example 1

A monocell was manufactured by the same method as example 1 except that CMC-Na with a weight average molecular weight of 1,600,000 and a polydispersity index of 6.7 was used in the negative electrode mix slurry and its amount in the active material layer was 1.1 wt %.

Comparative Example 2

A monocell was manufactured by the same method as example 1 except that CMC-Na with a weight average molecular weight of 2,000,000 and a polydispersity index of 7.1 was used in the negative electrode mix slurry.

Comparative Example 3

A monocell was manufactured by the same method as example 1 except that CMC-Na with a weight average molecular weight of 3,000,000 and a polydispersity index of 6.2 was used in the negative electrode mix slurry.

Evaluation Example

For the negative electrodes obtained in examples 1-2 and comparative examples 1-3, the adhesiveness was evaluated, and the discharge resistance of the monocells was measured, and the results are shown in Table 1.

Adhesiveness: After the electrode was cut and surface of active material layer was fixed to a slice glass, 180 degree peel strength was measured when peeling off the electrode current collector.

Discharge resistance: For the batteries manufactured in examples 1-2 and comparative examples 1-3, the discharge resistance was measured at 1 C for 30 seconds each state of charge (SOC) where the charge termination voltage is set to 4.2 V and the discharge termination voltage is set to 3.0 V.

TABLE 1

| | CMC-Na weight average molecular weight ($M_w$) | Poly-dispersity index (PDI) | Amount in an active material layer (wt %) | Adhesive strength (gf/15 mm) | Discharge resistance (ohm) (SOC50) |
|---|---|---|---|---|---|
| Example 1 | 2,200,000 | 12.9 | 0.8 | 26.7 | 1.650 |
| Example 2 | 2,000,000 | 24.8 | 0.8 | 27.6 | 1.622 |
| Comparative example 1 | 1,600,000 | 6.7 | 1.1 | 21.7 | 1.622 |
| Comparative example 2 | 2,000,000 | 7.1 | 0.8 | 22.8 | 1.687 |
| Comparative example 3 | 3,000,000 | 6.2 | 0.8 | 29.1 | 1.706 |

The present disclosure has been hereinabove described in detail. While the present disclosure have been described with respect to the exemplary embodiments, the present disclosure may be used in many different combinations, modifications and environments. In other words, modification or change may be made within the range of inventive concept disclosed herein, equivalents to the disclosure and/or the range of ordinary skill or knowledge. The above exemplary embodiments are provided to describe the best mode of practicing the present disclosure, and a variety of required modifications may be further made on different known modes of practicing inventions such as the present disclosure in using the inventions, and in specific application field and for specific use of the disclosure. Accordingly, the above detailed description is not intended to limit the present disclosure to the disclosed exemplary embodiments.

What is claimed is:

1. A negative electrode mix slurry for a lithium secondary battery, comprising:
   a negative electrode active material;
   carboxymethyl cellulose as a thickening agent with a polydispersity index (PDI) of about 12.9 or more and a weight average molecular weight of about 2,000,000 or more; and
   a binder polymer.

2. The negative electrode mix slurry for a lithium secondary battery according to claim 1, wherein the carboxymethyl cellulose consists of carboxymethyl cellulose with a molecular weight ranging from about 1,000,000 to 3,000,000.

3. The negative electrode mix slurry for a lithium secondary battery according to claim 1, wherein the carboxymethyl cellulose has a degree of substitution ranging from about 0.6 to 1.2.

4. The negative electrode mix slurry for a lithium secondary battery according to claim 1, wherein the carboxymethyl cellulose is obtained by mixing carboxymethyl cellulose with a weight average molecular weight of less than about 2,000,000 and carboxymethyl cellulose with a weight average molecular weight of about 2,000,000 or more.

5. The negative electrode mix slurry for a lithium secondary battery according to claim 1, wherein the carboxymethyl cellulose is obtained by milling carboxymethyl cellulose with a weight average molecular weight of about 3,000,000 or more.

6. A negative electrode for a lithium secondary battery wherein the carboxymethyl cellulose defined in claim 1 is present in an amount of about 0.6 to 1.2 wt % of negative electrode active material layer.

7. The negative electrode for a lithium secondary battery according to claim 6, wherein a sum of the carboxymethyl cellulose and binder polymer amounts to about 1.0 to 5.0 wt % of negative electrode active material layer.

8. The negative electrode for a lithium secondary battery according to claim 1, carboxymethyl cellulose is in a form of salt such as lithium (Li) salt, sodium (Na) salt, potassium (K) salt or ammonium (NH3) salt, or a combination thereof.

9. A lithium secondary battery comprising the negative electrode defined in claim 6.

10. The negative electrode mix slurry for a lithium secondary battery according to claim 1, further comprising a solvent.

11. The negative electrode mix slurry for a lithium secondary battery according to claim 1, the polymer binder comprises at least one selected from the group consisting of polyvinylidene fluoride-co-hexafluoropropylene, polyvinylidene fluoride-co-trichloroethylene, polymethylmethacrylate, polybutylacrylate, polyacrylonitrile, polyvinylpyrrolidone, polyvinylacetate, polyvinyl alcohol, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and styrene-butadiene rubber.

12. The negative electrode mix slurry for a lithium secondary battery according to claim 1, wherein the negative electrode material comprises carbon materials having graphite-based carbon; metal composite oxide; lithium metal; lithium alloys; silicon-based alloys; tin-based alloys; oxide; conductive polymer; and Li—Co—Ni-based materials.

13. The negative electrode mix slurry for a lithium secondary battery according to claim 12, wherein the carbon materials having graphite-based carbon comprises non-graphitizable carbon, natural graphite, artificial graphite, or graphite; the metal composite oxide comprises lithium titanium oxide, $Li_xFe_2O_3 (0 \leq x \leq 1)$, $Li_xWO_2 (0 \leq x \leq 1)$, $Sn_xMe_{1-x}Me'_yO_z$ wherein Me is Mn, Fe, Pb, or Ge, Me' is Al, B, P, Si, elements of Group 1, 2 and 3 in the periodic table, or halogen, $0<x\leq1$, $1\leq y\leq3$, $1\leq z\leq8$; the oxide comprises SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$.

14. The negative electrode mix slurry for a lithium secondary battery according to claim 12, wherein the conductive polymer comprises polyacetylene.

15. The negative electrode mix slurry for a lithium secondary battery according to claim 10, wherein the solvent comprises water.

* * * * *